(12) United States Patent
Yang et al.

(10) Patent No.: US 12,267,307 B2
(45) Date of Patent: Apr. 1, 2025

(54) SECURE CONSOLE LOG INTERACTION IN A DATA CENTER

(71) Applicant: INTERNATIONAL BUSINESS MACHINES CORPORATION, Armonk, NY (US)

(72) Inventors: Na Fei Yang, Beijing (CN); Dan Qing Huang, Beijing (CN); Ming Xia Guo, Beijing (CN); Ning LL Liu, Beijing (CN); Peng Hui Jiang, Beijing (CN); Yi Feng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

(21) Appl. No.: 18/124,284

(22) Filed: Mar. 21, 2023

(65) Prior Publication Data
US 2024/0323168 A1   Sep. 26, 2024

(51) Int. Cl.
*H04L 9/40*   (2022.01)
*G06F 16/28*   (2019.01)
*H04L 9/30*   (2006.01)

(52) U.S. Cl.
CPC ........ *H04L 63/0428* (2013.01); *G06F 16/285* (2019.01); *H04L 9/30* (2013.01); *H04L 63/029* (2013.01)

(58) Field of Classification Search
CPC ..... H04L 63/0428; H04L 63/029; H04L 9/30; G06F 16/285
See application file for complete search history.

(56) References Cited

U.S. PATENT DOCUMENTS

| | | | |
|---|---|---|---|
| 9,292,412 B2 | 3/2016 | Mohindra et al. | |
| 2011/0225459 A1 | 9/2011 | Fahrig et al. | |
| 2014/0033200 A1* | 1/2014 | Tompkins | G06F 9/45558 713/168 |
| 2014/0095821 A1 | 4/2014 | Yang et al. | |
| 2015/0193328 A1 | 7/2015 | Deakin et al. | |
| 2021/0240839 A1 | 8/2021 | Tsirkin et al. | |

(Continued)

OTHER PUBLICATIONS

Anonymous, "Security/Guidelines/logging guidelines", https://wiki.openstack.org/wiki/Security/Guidelines/logging_guidelines, Archived on Nov. 23, 2022, 6 pages.

(Continued)

*Primary Examiner* — Chau Le
(74) *Attorney, Agent, or Firm* — Lily Neff; Andrew D. Wright; Calderon Safran & Wright P.C.

(57) ABSTRACT

A method includes: obtaining at least one real-time console log from a compute instance; tagging the at least one real-time console log with at least one log category based on at least one entry within the at least one real-time console log; generating at least one categorized console log; generating at least one encrypted categorized console log based on a public encryption key; publishing the at least one encrypted categorized console log to a log bus; communicating the at least one encrypted categorized console log over at least one multi-port secure tunnel to a user terminal device of a subscribed user; and publishing a private encryption key to the user terminal device of the subscribed user wherein the private encryption key facilitates decrypting the at least one encrypted categorized console log.

20 Claims, 6 Drawing Sheets

(56) References Cited

U.S. PATENT DOCUMENTS

| | | | |
|---|---|---|---|
| 2022/0052843 A1* | 2/2022 | Carver | G16H 80/00 |
| 2022/0116291 A1* | 4/2022 | Hines | H04L 41/069 |
| 2022/0365835 A1 | 11/2022 | Kandasamy et al. | |
| 2023/0032363 A1* | 2/2023 | Huo | H04L 9/0822 |
| 2023/0231709 A1* | 7/2023 | Doherty | H04L 9/065 |
| | | | 713/171 |
| 2024/0291808 A1* | 8/2024 | Aitken | H04L 63/0435 |

OTHER PUBLICATIONS

Zawoad et al., "SecLaaS: Secure Logging-as-a-Service for Cloud Forensics", https://dl.acm.org/doi/10.1145/2484313.2484342, 2013, 12 pages.

Anonymous, "About virtual server instances for VPC", https://cloud.ibm.com/docs/vpc?topic=vpc-about-advanced-virtual-servers#:~:text=Virtual Servers for VPC is,instances with high network performance., Nov. 14, 2022, 3 pages.

Anonymous, "Secure Tunnel", https://www.ibm.com/docs/en/cloud-paks/cloud-pak-watson-aiops/3.3.1?topic=connections-secure-tunnel, Dec. 8, 2022, 5 pages.

Anonymous, "What is a virtual private cloud (VPC)?", https://www.ibm.com/topics/vpc, Archived on Jan. 3, 2023, 10 pages.

\* cited by examiner

SECURE CONSOLE LOG INTERACTION IN A DATA CENTER

BACKGROUND

Aspects of the present invention relate generally to virtual compute instance bootstrap console logs and, more particularly, to using a log multiplexer to provide categorized bootstrap console logs to a user prior to initiating a console connection to a virtual server instance (VSI) or bare metal instance.

VSI or bare metal bootstrap console logs are used for troubleshooting to start a process of a VSI or computer system. Bootstrap console logs are produced at the time of boot before a user initiates a serial or virtual network computing (VNC) console connection. Bootstrap console logs contain key information that may assist with debugging VSI problems during VSI boot, such as listing of computing outputs in response to computer program inputs and instructions, or user inputs and instructions.

Currently, cloud-based console services may allow a user to access a VSI console through a graphical user interface (GUI) which may allow a customer to interact with the console connection, but which cannot provide VSI historical console logs before the customer initiates console connection.

SUMMARY

In a first aspect of the invention, there is a computer-implemented method including: obtaining, by a processor set, at least one real-time console log; tagging, by the processor set and using a log multiplexer and a log category knowledge base, the at least one real-time console log with at least one log category based on at least one entry within the at least one real-time console log to generate at least one categorized console log; encrypting, by the processor set and using a log encryption processor set, the at least one categorized console log based on a public encryption key; generating, by the processor set, at least one encrypted categorized console log; generating, by the processor set, at least one multi-port secure tunnel; publishing, by the processor set, and the at least one multi-port secure tunnel, the at least one encrypted categorized console log to a log bus; communicating, by the processor set, the at least one encrypted categorized console log over the at least one multi-port secure tunnel to a control panel of a subscribed user; and publishing, by the processor set, a private encryption key to the control panel of the subscribed user wherein the private encryption key facilitates decrypting the at least one encrypted categorized console log.

In another aspect of the invention, there is a computer program product including one or more computer readable storage media having program instructions collectively stored on the one or more computer readable storage media. The program instructions are executable to: obtain at least one real-time console log; tag the at least one real-time console log with at least one log category based on at least one entry within the at least one real-time console log to generate at least one categorized console log; encrypt the at least one categorized console log based on a public encryption key; generate at least one encrypted categorized console log; generate at least one multi-port secure tunnel; publish the at least one multi-port secure tunnel, the at least one encrypted categorized console log to a log bus; communicate the at least one encrypted categorized console log over the at least one multi-port secure tunnel to a control panel of a subscribed user; and publish a private encryption key to the control panel of the subscribed user wherein the private encryption key facilitates decrypting the at least one encrypted categorized console log.

In another aspect of the invention, there is a system including a processor set, one or more computer readable storage media, and program instructions collectively stored on the one or more computer readable storage media. The program instructions are executable to: obtain at least one real-time console log; tag the at least one real-time console log with at least one log category based on at least one entry within the at least one real-time console log to generate at least one categorized console log; encrypt the at least one categorized console log based on a public encryption key; generate at least one encrypted categorized console log; generate at least one multi-port secure tunnel; publish the at least one multi-port secure tunnel, the at least one encrypted categorized console log to a log bus; communicate the at least one encrypted categorized console log over the at least one multi-port secure tunnel to a control panel of a subscribed user; and publish a private encryption key to the control panel of the subscribed user wherein the private encryption key facilitates decrypting the at least one encrypted categorized console log.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
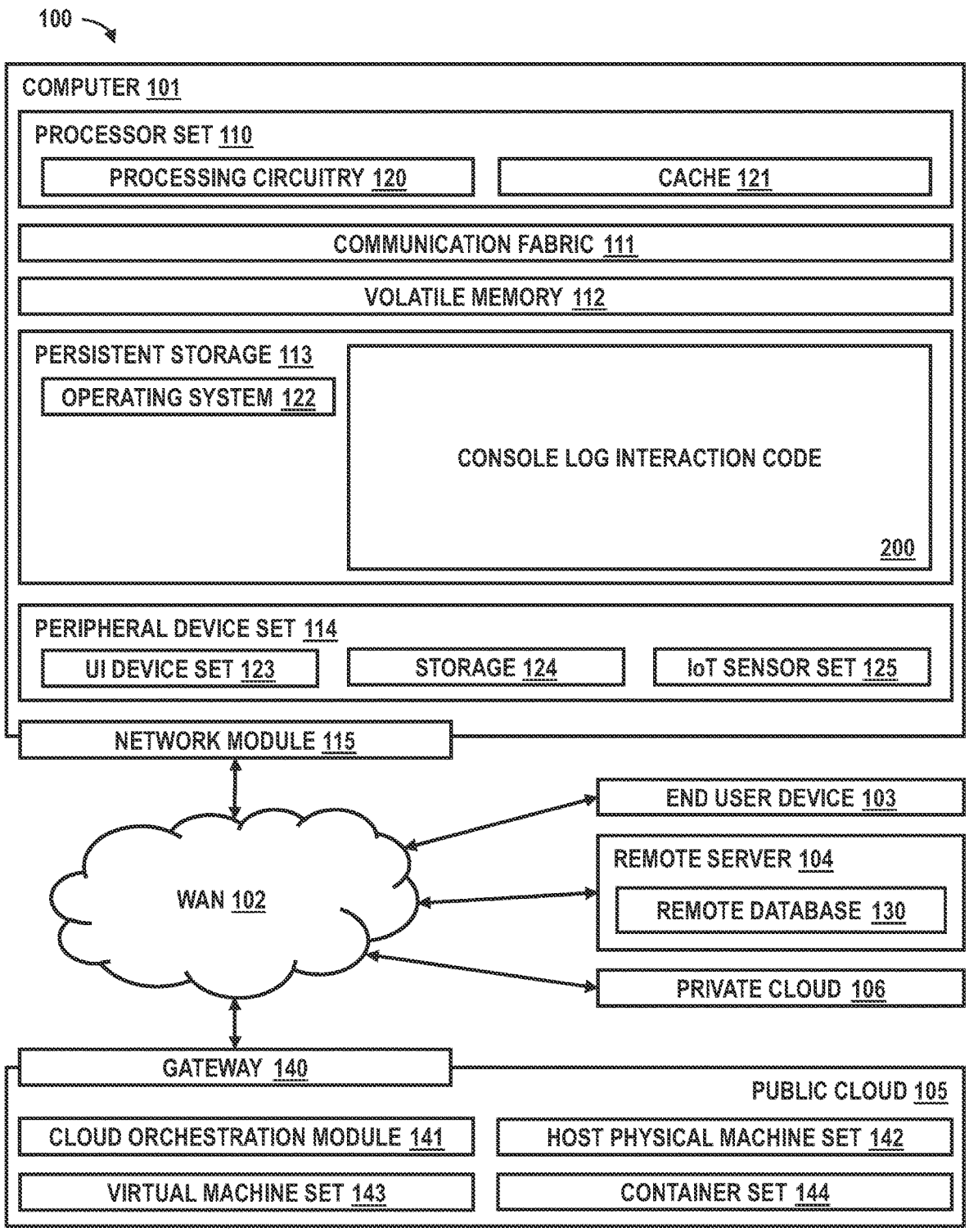
FIG. 1 depicts a computing environment according to an embodiment of the present invention.

Aspects of the present invention relate generally to virtual compute instance bootstrap console logs and, more particularly, to using a log multiplexer and log category database to provide historical bootstrap console logs to a user prior to initiating a console connection to a VSI.

Console services may allow a user to access a VSI console through a GUI which may allow a customer to interact with the console connection, but which cannot provide VSI historical console logs before the customer initiates console connection. Console logs may be stored in plain-text format and provided as historical console logs to consumers, but this method requires high-risk storage of historical console logs in secure public cloud-based computer system.

Alternative methods may include implementing a specialized console device configured to record unencrypted console logs at VSI or bare metal startup and store the console logs on a VSI. The method may include communicating the unencrypted console logs to a computing node, which leaves unencrypted console logs exposed to access by third parties.

In embodiments, implementations of the invention collect, in real-time, console log data during startup of VSI or bare metal instances. Embodiments may redirect console logs into a logging multiplexer via a terminal device peer in operable connection with a console log interaction code. The log multiplexer may also simultaneously provide serial console functionality to end users. Embodiments may construct a console log category knowledge base, and use the same, to tag console log entries according to information within console logs including, but not limited to, sensitivity, consume, or tenant. Embodiments may also accept subscriptions from multiple user consumers, including VSI owners, system administrators, system operators, or metrics consumers, via user registration. Embodiments may encrypt console logs based on a public key for multiple consumer users via a log encryption processor. Embodiments may provide an interactive serial console to consumer users as well as publishing console log information to specific consumer users according to a publication-and-subscription model without affecting service of the interactive serial console. Embodiments may use secure tunnel technology with a plurality of secure ports to build multiple secure tunnels for console log transfer, including encrypted data sets of console logs, via the publication-and-subscription model or the interactive serial console, without interrupting functionality of either. Embodiments may decrypt the console logs via a consumer user private encryption key as part of a user facing control panel. Embodiments may optimize the log category knowledge base according to the information within console logs. In embodiments, the knowledge base is based on a feedback mechanism. For example, the knowledge base may be initialized with user role and log categories mappings that specify which users obtain which categories of logs. This mapping may be adjusted over time in the knowledge base in response to receiving user feedback about which log categories they do, and do not, want to see. The mapping may be adjusted by changing one or more of the user roles and log categories defined for users in the knowledge base.

In this manner, implementations of the invention address the above-described problems by securely categorizing, encrypting, and transferring console logs containing key information that may assist with debugging problems during VSI or bare metal boot as well as providing historical console logs before console connection is initiated. Implementations of the invention thus have practical applications because they provide improvements in the fields of securely encrypting categorized console logs and publishing encrypted categorized console logs through secure tunnels to ensure console logs are not tampered with, while maintaining existing user-console service functions without dependency on specialized hardware.

In embodiments, implementations of the invention may include a log multiplexer configured to receive multiple inputs via a terminal peer device which may be operably coupled with a plurality of terminal devices used for virtual network computing access, for example. The log multiplexer may also perform as a serial console, allowing implementations of the invention to communicate with and manage devices such as servers, switches, routers and to access connected devices such as data centers, servers, or networks.

It should be understood that, to the extent implementations of the invention collect, store, or employ personal information provided by, or obtained from, individuals (for example, users accessing VNC systems), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as console log interaction code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip packages and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101.

Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machines that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
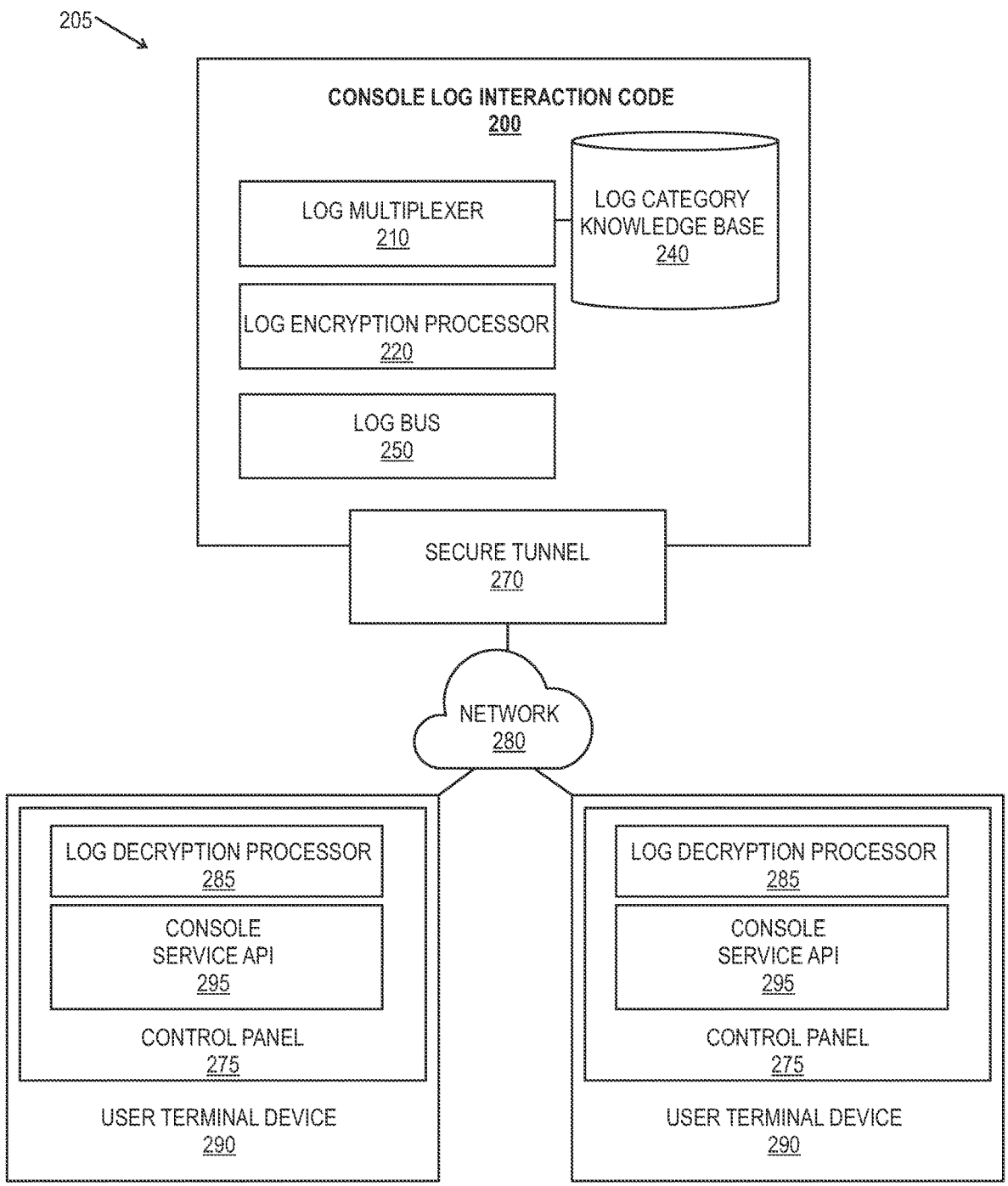
FIG. 2 shows a block diagram of an exemplary environment in accordance with aspects of the present invention.

FIG. 2 shows a block diagram of an exemplary environment 205 in accordance with aspects of the invention. In embodiments, the environment includes console log interaction code implemented on a computer 101 and processor set 110, as seen in FIG. 1. Embodiments may redirect console logs into a logging multiplexer 210 via a terminal device peer within a console log interaction code 200. The terminal device peer is in operable communication with a plurality of end user terminal devices 290. The terminal device peer receives, as inputs, real time console logs collected during startup of VSI or bare metal instances operating as end user devices 290. The terminal device peer redirects collected console logs to the log multiplexer 210. The log multiplexer 210 tags the at least one real-time console log with at least one log category based on at least one entry within the at console log to generate a categorized console log. In this way, many console logs may be tagged with many categories based on the contents of the console logs themselves. The log multiplexer 210 may use the log category knowledge base 240 to tag console log entries according to console log information. The log encryption processor 220 encrypts console logs received by the log multiplexer 210 based on a public key accessible by multiple end user consumers. Aside from an interactive serial console, shown in FIG. 5, the console log interaction code 200 may publish encrypted console logs to a log bus 250. Encrypted console logs are then communicated over a secure tunnel 270 on the network 280 based on a publication and subscription model. That is, specific users may subscribe to specific log categories within the knowledge base such that they receive, on the control panel 275 of the user terminal device 290, console logs including console log entries which have been tagged with specific log categories. Multiple users may subscribe to receive console logs including console log entries which have been tagged with specific log categories, as shown in FIG. 3.

In embodiments, the console log interaction code 200 of FIG. 2 includes a log multiplexer 210, a log category knowledge base 240, a logging encryption processor 220, and a log bus 250, each of which may comprise modules of the code of block 200 of FIG. 1. These modules of the code of block 200 are executable by the processing circuitry 120 of FIG. 1 to perform the inventive methods as described herein. The console log interaction code 200 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Figure 3:
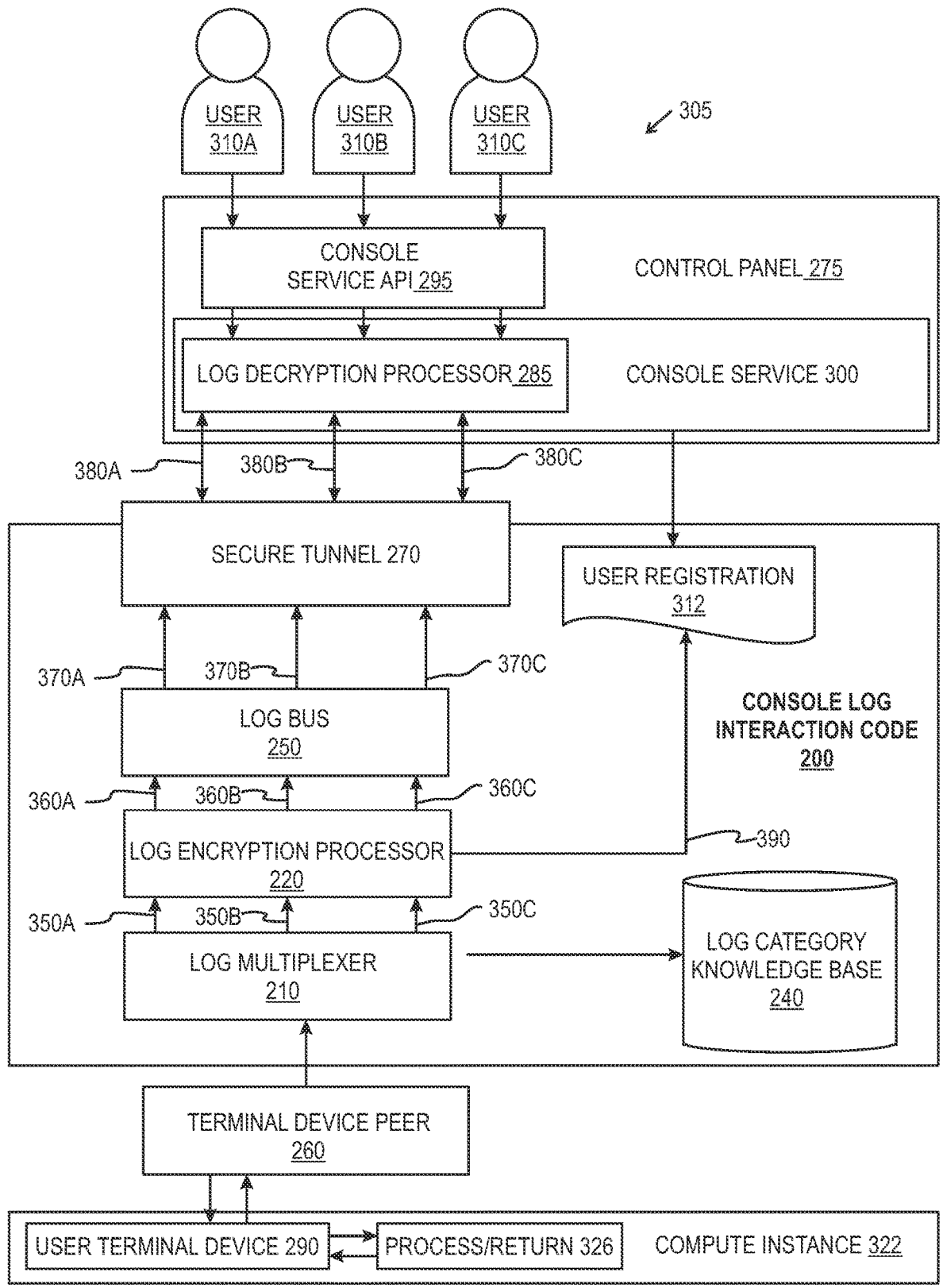
FIG. 3 shows a block diagram of an exemplary environment in accordance with aspects of the present invention.

FIG. 3 shows a diagram of an exemplary environment 305 in accordance with aspects of the invention. A plurality of users 310A, 310B, and 310C can utilize the console log interaction code 200, as seen in FIG. 1 and FIG. 2, to independently subscribe to published categorized console log entries via an end user device 290. For example, User 310A may subscribe to categorized console log entries including entries relating to error messages. User 310B may subscribe to categorized console log entries including entries relating to informational entries. User 310C may subscribe to categorized console log entries including entries relating to error messages and informational entries. Alternatively, User 310A may be an "operator user" and may access the compute instance 322 to perform tasks without receiving console logs via the console log interaction code 200. User 310B may be an "owner user" and may utilize the console log interaction code 200 to receive full, uncategorized console logs of the compute instance 322 being used by User 310A. User 310C may be a "monitor user" and may utilize the console log interaction code 200 to receive categorized console logs or subscribe to published categorized console log entries of the compute instance 322 being used by User 310A without affecting service of an interactive serial console (e.g., User 310A) and while maintaining uninterrupted access to the interactive serial console and a control panel, such as a web-based GUI, of an end user console service. The interactive serial console may be a console configured to allow end users to access and manage, over a network, a VSI console or bare metal instance console through a GUI, such as the control panel 275. The end user console service may be a software application accessible by end-users configured for tracking, debugging, or troubleshooting startup processes of a VSI or bare metal instance.

Users 310A, 310B, and 310C can access the console log interaction code 200 via a control panel 275, on a user terminal device, depicted as reference numeral 290 in FIG. 2. The control panel 275 may include a console service application programming interface (API) 295 and console service 300, which includes a log decryption processor 285. The console service 300 facilitates registration of each user with the console log interaction code 200 via a user registration module 312. User registration module 312 accepts and manages subscriptions of users to categorized console log entries allowing registered users access to the control panel 275. User registration module 312 also stores a public encryption key to allow subscription for multiple consumer users via a log encryption processor. User registration module 312 may store user data such as, but not limited to, usernames, user roles, and public keys.

Embodiments may redirect console logs generated by a compute instance 322, e.g., a VSI hosted on a cloud-computing infrastructure or a bare metal instance, including user terminal device 290 and process/return 326. In embodiments, the process/return 326 is a system process running inside the compute instance 322. In embodiments, the process/return 326 receives a customer's interactable instructions, executes the instructions, and returns a result to the user terminal device 290. In embodiments, the process/return 326 also executes system calls and generates system logs and sends these to the user terminal device 290. In embodiments, the user terminal device 290 then sends this data to the terminal device peer 260. The console logs generated by a compute instance 322 are communicated to or retrieved by a terminal device peer 260. The terminal device peer 260 can receive or retrieve many console logs from many compute instances 322. The terminal device peer 260 redirects collected console logs to the log multiplexer 210. The log multiplexer 210 is based on multiplexing technology and implements a module that can simultaneously support a serial console as well as obtaining console logs through the terminal device peer 260. The log multiplexer 210 listens to the terminal device peer 260, as well as to requests for all categorized logs and interactive serial console client requests. Data received from serial console client is read and sent to the terminal device peer 260. Data received from the terminal device peer 260 is read and sent to a serial console client (shown in FIG. 5 as reference numeral 524) and cached in a memory cache, such as the log memory cache 510 shown in FIG. 5. Alternatively, data received from the terminal device peer 260 is read and sent to the log multiplexer 210. The log multiplexer 210 reads the cache, depicted in FIG. 5 as log memory cache 510, and categorizes the console logs based on categorizations within the log category knowledge base 240. Multiple data sets 350A, 350B, and 350C which include categorized console logs are communicated from the log multiplexer 210 to the log encryption processor 220 at the request of subscriptions relating to users 310A, 310B, and 310C, respectively. The log encryption processor 220 retrieves the public encryption key 390 from the user registration module 312 and encrypts the multiple data sets with the public encryption key 390 and publishes the encrypted multiple data sets 360A, 360B, and 360C to the log bus 250. The console log interaction code 200 opens multiple ports and corresponding multiple secure tunnels 270 for encrypted data set transfer (shown to the secure tunnel 270 at 370A, 370B, and 370C, and shown from the secure tunnel 270 at 380A, 380B, and 380C) of encrypted console logs to the log decryption processor 285 within the console service 300. Embodiments may use secure tunnel technology with a plurality of secure ports to build multiple secure tunnels for encrypted console log transfer 380A, 380B, and 380C via the publication-and-subscription model or the interactive serial console, without interrupting the functionality of either. The log decryption processor 285 decrypts the encrypted data sets 380A, 380B, and 380C using a private encryption key specific to the respective user accessing the control panel 275.

Figure 4:
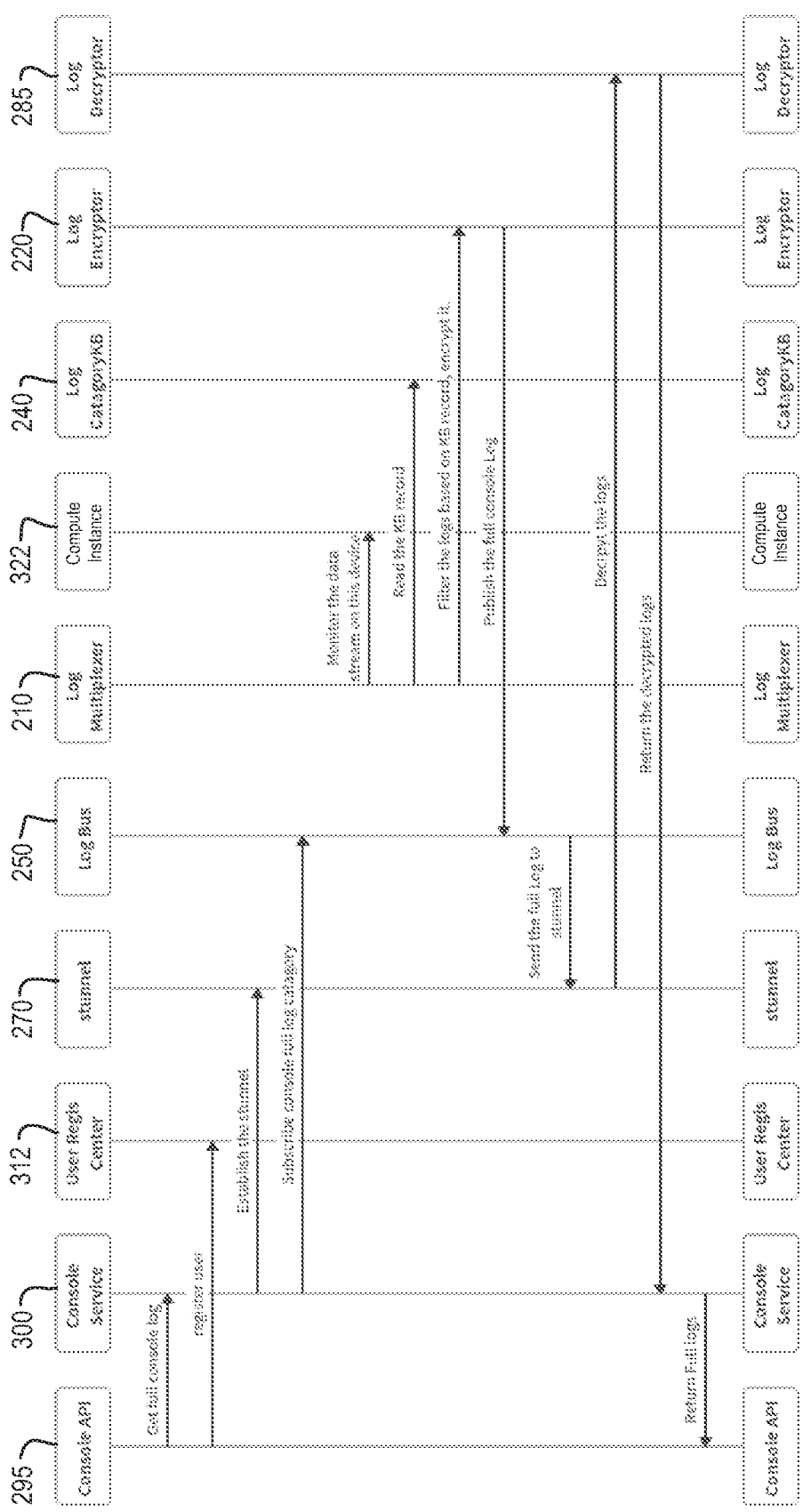
FIG. 4 shows a flowchart of an exemplary method in accordance with aspects of the present invention.

FIG. 4 shows an activity diagram in accordance with aspects of the invention. As seen in FIG. 3, the control panel 275 may include a console service API 295 and console service 300 which may communicate requests for console logs. The console API 295 also allows for the registration of users via the user registration module 312. A secure tunnel 270 is established between the console service 300 and the log bus 250 in response to requests for console logs. Additionally, the console service 300 allows for the subscription to console log categories published to the log bus 250. The log multiplexer 210 monitors console log data streams of at least one compute instance 322, which may be a software terminal (TTY device), a software pseudo-terminal (PTY device), or a logical partition of a computer devices hard ware resources, virtualized as a standalone computer (LPAR), based on requests for console logs. The log multiplexer 210 may read the log category knowledge base 240, filter console logs based on the log category knowledge base 240 record and communicate filtered console logs to the log encryptor 220, which encrypts the categorized console logs. Encrypted categorized console logs are published by the log encryptor 220 to the log bus 250. Log bus 250 may send published full console logs over the secure tunnel 270. Published categorized console logs are sent over the secure tunnel 270 to a log decrypter 285. The log decrypter 285 decrypts the encrypted categorized console logs and provides the decrypted categorized console logs from the console service 300 to the console API 295.

Figure 5:
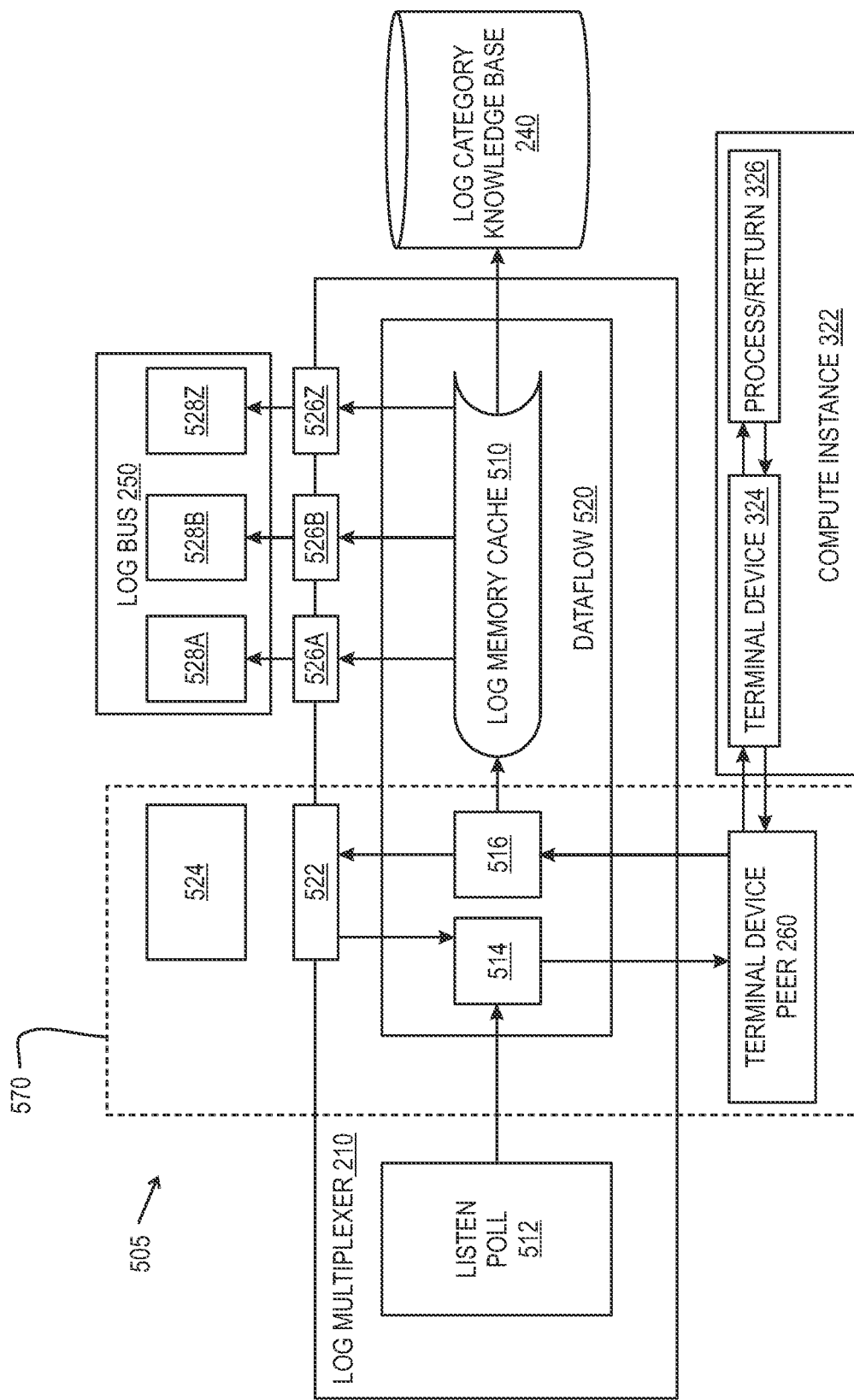
FIG. 5 shows a block diagram of an exemplary environment in accordance with aspects of the present invention.

FIG. 5 shows a diagram of an exemplary environment 505 including a log multiplexer 210 in accordance with aspects of the invention. A user can utilize an interactive serial console 570 including a serial console client 524 operably coupled with a serial port 522 for sending data 514 from a serial console client to a terminal device peer 260 and receiving data 516 from a compute instance 322 from the terminal device peer 260. Console logs generated by a compute instance 322 are also communicated to or retrieved by a terminal device peer 324. The interactive serial console 570 allows implementations of the invention to communicate with and manage devices such as servers, switches, routers and to access connected devices such as data centers, servers, or networks on a non-publication-subscription model. The terminal device peer 260 can receive or retrieve many console logs from many compute instances 322. In this way, data 516 communicated from terminal device peer 260 to the log multiplexer 210 includes compiled data relating to both the serial console client and multiple compute instances 322. Compiled data 516 (including console logs) is stored in the log memory cache 510 and which is categorized by the log multiplexer 210 based on categorizations within the log category knowledge base 240. A listening poll 512 actively monitors dataflow 520 and the status of the serial port 522 as well as ports 526A, 526B, and 526Z for data communicated from the serial console client 524, and for requests from any of log clients 528A, 528B, or 528Z within the log bus 250. Individual requests for, or subscriptions for, categorized console logs activates redirection of the categorized console logs to the log bus 250 and communication of the categorized console logs over secure tunnel without affecting service of the interactive serial console client, as previously detailed in the description of FIG. 2, FIG. 3, and FIG. 4.

Figure 6:
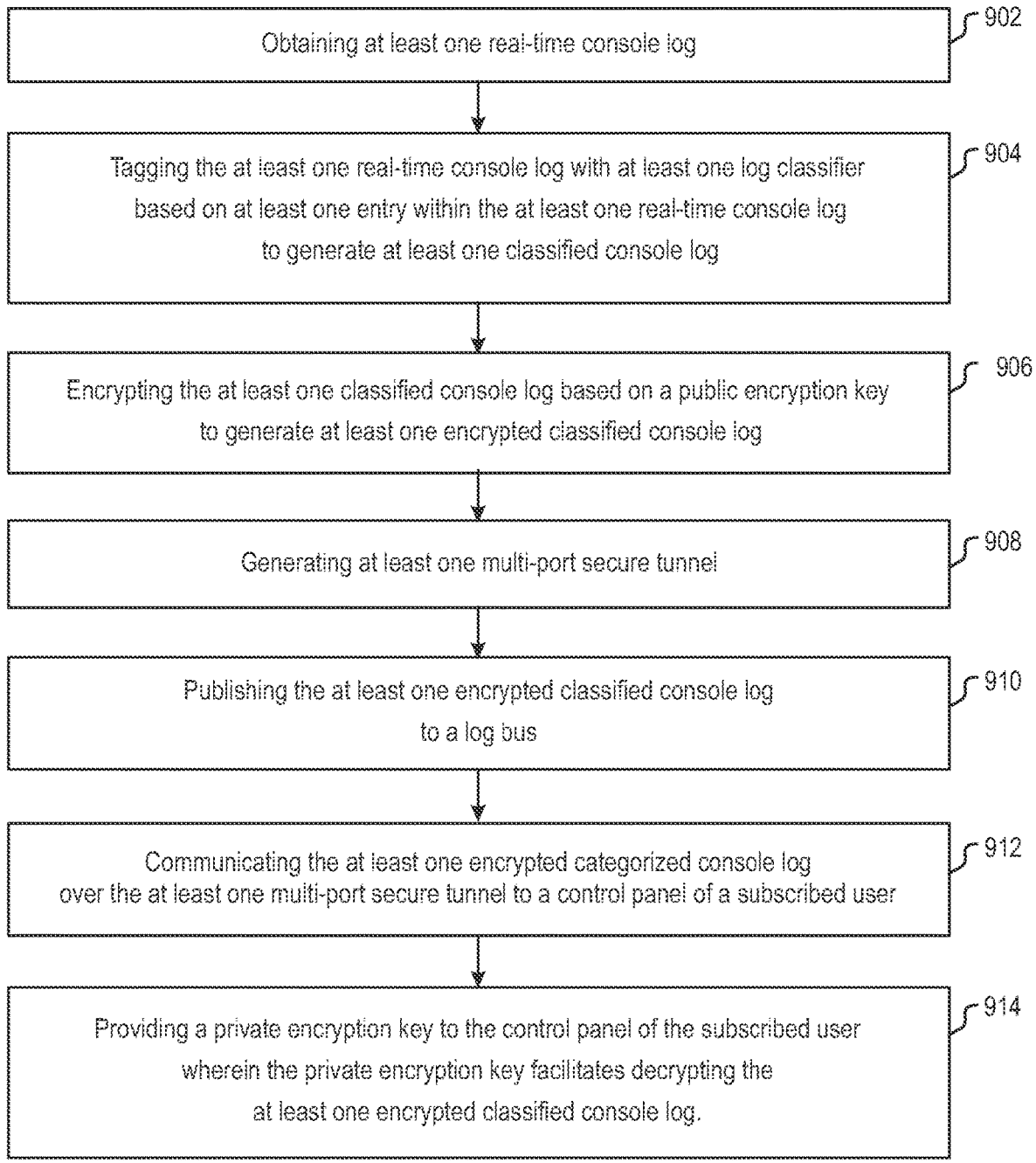
FIG. 6 shows a flowchart of an exemplary method in accordance with aspects of the present invention.

FIG. 6 shows a flowchart of an exemplary method in accordance with aspects of the present invention. Operations of the method may be carried out in the environment of FIG. 2, FIG. 3, and FIG. 4 and are described with reference to elements depicted in FIG. 2, FIG. 3, and FIG. 4.

At operation 902, the system obtains at least one real-time console log. In embodiments, the console log interaction code 200 receives or retrieves one or more console logs from VSI or bare metal compute instances. The console logs generated by a compute instance at boot are communicated to or retrieved by a terminal device peer on a network in operable communication with the compute instances and the terminal device peer.

At operation 904, the system tags the real-time console logs with at least one log categorizer based on at least one entry within the console logs to generate at least one categorized console log. Categories for console logs and console log entries may be stored in a log category knowledge base accessible by a log multiplexer. The log multiplexer may receive many inputs of console logs from a terminal device peer or read them from a memory cache and categorize log entries individually or categorize console logs wholly, including categorizing logs and entries in multiple categories. Categorized console logs may be communicated to a log encryption processor to be encrypted.

At operation 906, the system encrypts the categorized console logs based on a public encryption key via a log encryption processor to generate encrypted categorized console logs. The public key may be retrieved from a user registration module where the public key is configured for allowing users registered with the user registration module to gain access to the encrypted categorized console logs.

At operation 908, the system generates at least one multi-port secure tunnel over a network between the console log interaction code and an end user device. The end user device may be a terminal device with access to a control panel having a console service API and a log decryption processor.

At operation 910, the system publishes the encrypted categorized console log to a log bus. At operation 912, encrypted categorized console logs are then communicated from the log bus over the secure tunnel on a network based on a publication and subscription model, and subsequently to a control panel of a subscribed user.

At operation 914, the system provides a private encryption key to the control panel of individual subscribed users wherein the private encryption key facilitates decrypting the at least one encrypted categorized console logs associated with the specific subscribed user's subscription to categories. In embodiments, the system publishes the private encryption key to the control panel of the subscribed user. The private key may also be transferred in other secure manners.

In embodiments, a service provider could offer to perform the processes described herein. In this case, the service provider can create, maintain, deploy, support, etc., the computer infrastructure that performs the process operations of the invention for one or more customers. These customers may be, for example, any business that uses technology. In return, the service provider can receive payment from the customers under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    obtaining, by a processor set, at least one real-time console log from a compute instance;
    tagging, by the processor set, the at least one real-time console log with at least one log category based on at least one entry within the at least one real-time console log;
    generating, by the processor set, at least one categorized console log;
    generating, by the processor set, at least one encrypted categorized console log based on a public encryption key;
    publishing, by the processor set, the at least one encrypted categorized console log to a log bus;
    communicating, by the processor set, the at least one encrypted categorized console log over at least one multi-port secure tunnel to a user terminal device of a subscribed user; and
    publishing, by the processor set, a private encryption key to the user terminal device of the subscribed user wherein the private encryption key facilitates decrypting the at least one encrypted categorized console log.

2. The method of claim 1, further comprising:
    decrypting the at least one encrypted categorized console log via the private encryption key.

3. The method of claim 1, further comprising:
    registering at least one user to a control panel.

4. The method of claim 1, further comprising:
    accessing at least one encrypted categorized console log via an end user device.

5. The method of claim 1, further comprising:
    accessing an interactive serial console; and
    accessing an end user device comprising a control panel of an end user console service.

6. The method of claim 1, wherein the publishing the at least one encrypted categorized console log to a control panel of a subscribed user occurs without affecting service of an interactive serial console client.

7. The method of claim 1, wherein the obtaining at least one real-time console log comprises obtaining a plurality of real-time console logs from a terminal device and a serial console client.

8. The method of claim 1, wherein the obtaining at least one real-time console log comprises obtaining a plurality of real-time console logs from a pseudo-terminal (PTY device).

9. The method of claim 1, wherein the publishing the at least one encrypted categorized console log to a log bus comprises publishing a plurality of encrypted categorized console logs from a terminal device and a serial console client.

10. The method of claim 1, further comprising generating the at least one multi-port secure tunnel.

11. The method of claim 1, wherein the compute instance comprises a virtual server instance.

12. The method of claim 1, wherein the compute instance comprises a bare metal server.

13. A computer program product comprising one or more computer readable storage media having program instructions collectively stored on the one or more computer readable storage media, the program instructions executable to:
    obtain at least one real-time console log;
    tag the at least one real-time console log with at least one log category based on at least one entry within the at least one real-time console log;
    generate at least one categorized console log;
    generate at least one encrypted categorized console log based on a public encryption key;
    publish the at least one multi-port secure tunnel, the at least one encrypted categorized console log to a log bus;
    communicate the at least one encrypted categorized console log over the at least one multi-port secure tunnel to a control panel of an end user device of a subscribed user; and
    publish a private encryption key to the control panel of an end user device of the subscribed user wherein the private encryption key facilitates decrypting the at least one encrypted categorized console log.

14. The computer program product of claim 13, wherein the program instructions are executable to:
    decrypt the at least one encrypted categorized console log via the private encryption key.

15. The computer program product of claim 13, wherein the program instructions are executable to:
    register at least one user, by a processor set, to a control panel of the end user device.

16. The computer program product of claim 13, wherein the program instructions are executable to:
    access an end user device comprising an interactive serial console and a control panel of an end user console service.

17. The computer program product of claim 13, wherein the program instructions are executable to:
    access an of an end user device comprising an interactive serial console and a control panel of an end user console service.

18. The computer program product of claim 13, wherein the obtaining comprises obtaining a plurality of real-time console logs from a terminal device and a serial console client.

19. The computer program product of claim 13, wherein the publishing the at least one encrypted categorized console log to a log bus comprises publishing, by the processor set, a plurality of encrypted categorized console logs from a terminal device and a serial console client.

20. A system comprising:
    a processor set, one or more computer readable storage media, and program instructions collectively stored on the one or more computer readable storage media, the program instructions executable to:
    obtain at least one real-time console log;
    tag the at least one real-time console log with at least one log category based on at least one entry within the at least one real-time console log;
    encrypt the at least one categorized console log based on a public encryption key;

generate at least one encrypted categorized console log;
publish the at least one multi-port secure tunnel, the at least one encrypted categorized console log to a log bus;
communicate the at least one encrypted categorized console log over the at least one multi-port secure tunnel to a of an end user device of a subscribed user; and
publish a private encryption key to an end user device wherein the private encryption key facilitates decrypting the at least one encrypted categorized console log.

* * * * *